(12) United States Patent
Kimelman

(10) Patent No.: US 8,826,433 B2
(45) Date of Patent: Sep. 2, 2014

(54) SECURITY INTRUSION DETECTION AND RESPONSE

(75) Inventor: Paul Kimelman, Alamo, CA (US)

(73) Assignee: Texas Instruments Incorporated, Dallas, TX (US)

( * ) Notice: Subject to any disclaimer, the term of this patent is extended or adjusted under 35 U.S.C. 154(b) by 83 days.

(21) Appl. No.: 13/069,352

(22) Filed: Mar. 22, 2011

(65) Prior Publication Data

US 2011/0231932 A1    Sep. 22, 2011

Related U.S. Application Data

(60) Provisional application No. 61/316,148, filed on Mar. 22, 2010.

(51) Int. Cl.
*H04L 29/00* (2006.01)
(52) U.S. Cl.
USPC ............... 726/23; 726/16; 324/649
(58) Field of Classification Search
USPC ...................... 726/16, 23; 324/649
See application file for complete search history.

(56) References Cited

U.S. PATENT DOCUMENTS

| 2005/0018618 A1* | 1/2005 | Mualem et al. ............... 370/252 |
| 2006/0242696 A1* | 10/2006 | Cruzado et al. ................ 726/16 |
| 2010/0213951 A1* | 8/2010 | Lewis ........................... 324/649 |

OTHER PUBLICATIONS

"Logic," Merriam-Webster Dictionary, pp. 1-3, www.merriam-webster.com/dictionary/logic, Jan. 5, 2013.

* cited by examiner

*Primary Examiner* — Jeffrey Pwu
*Assistant Examiner* — Michael D Anderson
(74) *Attorney, Agent, or Firm* — Alan A. R. Cooper; Frederick J. Telecky, Jr.

(57) ABSTRACT

A system comprises an enclosure, host logic contained in the enclosure, and intrusion security logic also contained in the enclosure. The intrusion security logic is coupled to the host logic and configured to detect a security intrusion to the system and to respond to a security intrusion with a user-configurable trigger event. The intrusion security logic implements at least two tamper blocks, each tamper block configured to monitor one more input signals and initiate a trigger event when a security breach of the enclosure is detected. At least one of the tamper blocks comprises a state machine whose operation is controlled by way of user-programmable registers.

22 Claims, 2 Drawing Sheets

SECURITY INTRUSION DETECTION AND RESPONSE

CROSS-REFERENCE TO RELATED APPLICATION

The present application claims priority to U.S. Provisional Patent Application No. 61/316,148, filed on Mar. 22, 2010; which is hereby incorporated herein by reference.

BACKGROUND

Some systems contain sensitive information that should be protected. Such systems can be stolen and the data content accessed by opening the case of the system to gain access to the internal electronics (e.g., memory), drilling a hole through the case to gain access, freezing the electronics, and so on.

SUMMARY

In accordance with at least one embodiment, A system comprises an enclosure, host logic contained in the enclosure, and security intrusion logic also contained in the enclosure. The security intrusion logic is coupled to the host logic and configured to detect a security intrusion to the system and to respond to a security intrusion with a user-configurable trigger event. The security intrusion logic implements at least two tamper blocks, each tamper block configured to monitor one more input signals and initiate a trigger event when a security breach of the enclosure is detected. At least one of the tamper blocks comprises a state machine whose operation is controlled by way of user-programmable registers.

Another embodiments comprises a system that comprises a multiplexer having a plurality of input signals and logic coupled to the multiplexer and configured to implement a state machine. The logic is configured to detect a security intrusion to an enclosure of the system and to respond to the security intrusion with a user-configurable trigger event. The system also comprises a plurality of user-configurable registers that controls the operation of the state machine and the multiplexer.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections.

References are made herein to a "user" of the disclosed system. The term user refers to someone or some entity that owns and/or operates the system and is tasked with configuring system and ensuring the system functions as desired. In the context of a point-of-sale (POS) device, for example, the user is the entity/person that assembles, manufactures, sells or otherwise provides the POS device to a merchant.

In various embodiments described herein, a bit has a certain meaning based on its logic state (0 or 1). The polarity of the bits can be as described below or reversed.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
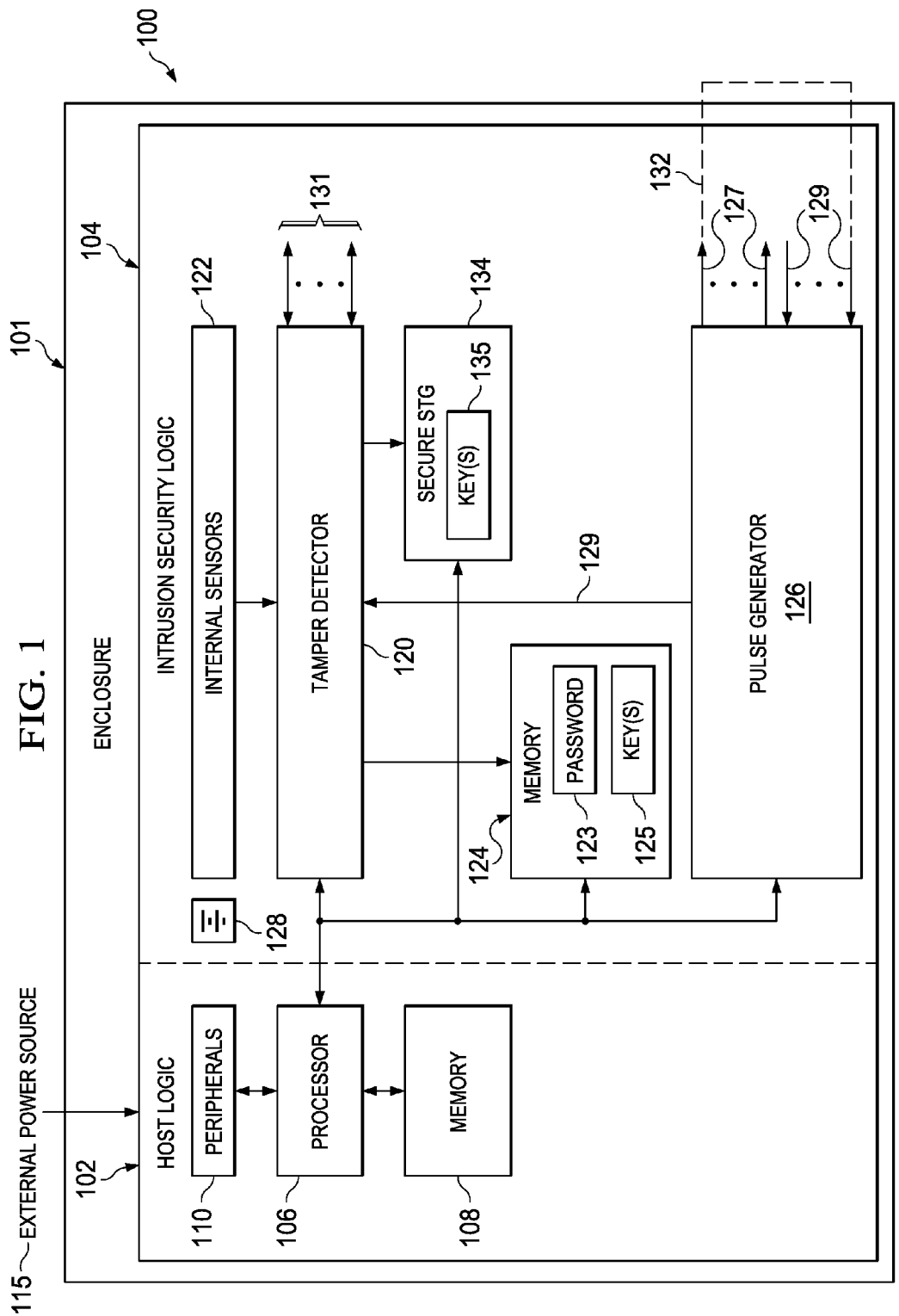
FIG. 1 shows a system in accordance with various embodiments.

FIG. 1 shows a system 100 in accordance with various embodiments. As shown, the system comprises an enclosure 101 containing host logic 102 and intrusion security logic 104. The enclosure 101 may be any type of contained support structure (metal, plastic, etc.) that is normally locked shut. The host logic 102 imparts functionality to the system 100 in accordance with its intended functionality. By way of one example, the system 100 may comprise a point-of-sale device that a purchaser uses to transact a purchase. The device may prompt the user to enter a personal identification number (PIN) and the device may communicate with a server via a secure communication link. The communication to the server may employ encryption for the data transmitted to the server. Thus, encryption keys may be stored on the system 100. Such encryption keys are highly confidential and are protected from unauthorized access to the system 100. In general, the system 100 can perform any of a variety of functions including, for example, point-of-sale transactions.

The host logic 102 preferably includes a processor 106 coupled to memory 108 and peripherals 110. The peripherals 110 may include an input device (e.g., a keypad), output devices (e.g., a display), network connections, etc. The host logic 102 preferably operates from an external power source 115 such as alternating current (AC) power and may comprise a built-in power supply to convert externally-provided AC power to a suitable direct current (DC) voltage.

The system also contains intrusion security logic 104 that preferably operates from either the external power source or from a battery 128 in the event that the main power source 115 fails or the system is otherwise unplugged from the main power source (e.g., during transportation of the system, while sitting on a shelf, during a theft, etc.). If and when needed, the battery 128 provides power to operate a tamper detector 120, internal sensors 122, memory 124, a pulse generator unit 126, and secure storage 124.

The intrusion security logic 104 functions to detect security breach to the system such as a hole being drilled through the enclosure 101, the enclosure otherwise being broken or tampered with, excessively cooling or heating the system, and the like. The intrusion security logic 104 detects such security breaches and responds accordingly. The response could be to scrub internal memory, reset the system, perform a direct memory access (DMA), or other suitable actions. The intrusion security logic 104 is user-configurable meaning a user, after the system has completed final assembly and has been shipped, can program various registers internal to the intrusion security logic 104 to configure the operation of the security features of the system. User-programmability includes specifying which types of input stimuli are to be monitored for detection of a security breach, how such signals are processed, and what sort of response the intrusion security logic 104 should perform upon detection of a security breach. Thus, the system's security features are not hard-wired or preset.

The tamper detector 120 preferably implements one or more user-configurable state machines. One or more programmable registers are also included that enable a user to configure the operation of the state machine(s). Such registers may be provided as part of the tamper detector 120 or elsewhere in the intrusion security logic 104.

The tamper detector 120 receives inputs from a variety of sources. One or more inputs to the tamper detector 120 originate from one or more internal sensors 122 (i.e., internal to the enclosure 101). Such sensors may include one or more temperature sensors, a voltage sensor (comparator), a current sensor (comparator), etc. The voltage sensor preferably monitors the voltage of, or related to, the external power source 115. Another voltage sensor may monitor the battery's voltage. Similarly, current sensors may monitor the current supplied by the external power source 115 to system 100 as well as the current from the battery 128.

The pulse generator unit 126 preferably comprises one or more pulse generators. In some embodiments, for example, the pulse generator unit 126 comprises four pulse generators, although in general there can be any number of pulse generators. One use for the pulse generator unit 126 is to output a pulse train via an output line 127 to a coil of wire wrapped around the enclosure 101. The coil of wire terminates back at an input 129 to the pulse generator unit 126. One illustrative coil of wire is illustrated via dashed line 132. The return signal to the pulse generator unit 126 should match the output pulse signal. A mismatch between output and input signals may be indicative of a compromise of the coil of wire 132. For example, if the coil of wire has been severed (e.g., by an unauthorized entity drilling through the enclosure 101), the pulse generator 126 may detect the intrusion attempt by a comparison of the input and output signals. Multiple pulse generators may be provided so as to have multiple coils of wire.

The tamper detector 120 also has one or more input/output (I/O) pins 131. The I/O pins can be used to provide additional tamper detection capability. For example, break away straps can be tied to the I/O pins 131 using pull-up or pull-down resistors. If such a strap breaks (indicative of a possible unauthorized access to the enclosure), the logic state on the corresponding I/O pin changes state.

The secure storage 134 preferably comprises a secure electrically-erasable programmable read only memory (EEPROM), or other suitable type of secure storage device. The secure storage 134 may be used to store any type of confidential data. In some embodiments, for example, the secure storage 134 stores one or more encryption keys 135 used by system 100 to engage in encrypted communications with a server.

The contents of the secure storage 134 are accessible in some embodiments by way of a password 123 that is stored in memory 124. Memory 124, preferably random access memory (RAM) preferably comprises battery-backed memory (powered by battery 128 in the event of a main power failure). Memory 124 may also store one or more keys 125 which may comprise short term session keys and keys that are not yet stored in the secure storage 134.

In accordance with various embodiments, the intrusion security logic 104 comprises a battery-backed power domain (via battery 128). As such, the intrusion security logic 104 continues to operate in the event of a malfunction of the main power source, a theft of the system, while the system is being transported, etc. The power mode in which the intrusion security logic operates when on battery power is referred to as the Hibernate (HIB) power mode or power island. The intrusion security logic 104 comprises a variety of mechanisms to detect a possible unauthorized tampering. Rather than the system 100 being pre-wired or pre-programmed to provide static security measures, the system 100 in accordance with the preferred embodiments, permits the user to configure the operation of the intrusion security logic 104. The user is permitted to configure which security inputs are to be monitored for a possible tampering, and how the logic 104 should respond to a detected security breach of the enclosure. Preferably, the tamper detector 120 implements one or more multi-state state machines whose operation is configurable by various user-programmable registers contained, for example, in the tamper detector 120. The following discussion explains an embodiment for how the intrusion security logic 104 can be programmed by a user.

Based on the above definition of a user, the programmability/configurability of the intrusion security logic 104 can occur after final assembly of the system 100 and after the system leaves the factory. Further, the same system can have its intrusion security logic 104 programmed and re-programmed multiple times during its operation life. The various registers described below can be programmed via an external workstation (not shown) connected to the system 100.

Figure 2:
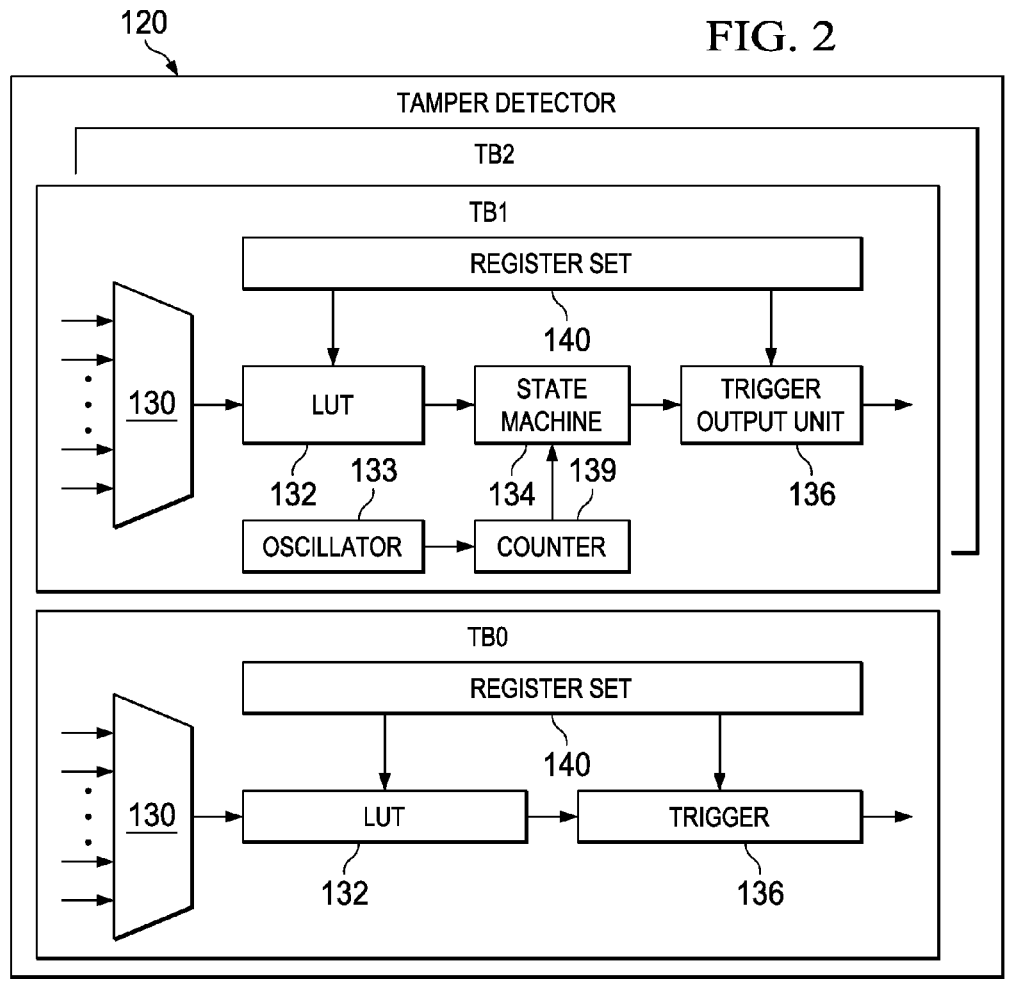
FIG. 2 shows an embodiment of the tamper detector of FIG. 1.

FIG. 2 illustrates an embodiment of the tamper detector 120. The tamper detector 120, by itself or in conjunction with one or more of the other elements of the intrusion security logic 104, preferably is implemented as an integrated circuit (IC) which comprises numerous transistors and other circuit components. The IC has a number of GPIO pins 131 which can be used as described herein.

As shown, the tamper detector 120 comprises three tamper blocks—TB0, TB1, and TB2—although other than three tamper blocks are possible. TB1 and TB2 preferably are identical. Each of TB1 and TB2 includes a multiplexer (MUX) 130 whose output is provided to a look-up table (LUT) 132. Logic that implements state machine 134 also is included, as well as one or more counters 139. One or more of the states may each have an associated counter to assist in controlling operation of the state machine. Each counter 139 counts clock cycles of an RC oscillator 133 or a divided down signal from the RC oscillator.

A trigger output unit 136 receives output signals from the logic that implements the state machine 134 and responds to a detected security event in a manner dictated by the user through programming of register set 140. The trigger output unit 136 can be configured to assert a trigger signal on any of the multiple GPIO pins. The register set 140 includes various registers (described below) that control the operation of the LUT 132, the state machine 134, and the trigger output unit 136. For example, the register set 140 defines which inputs to MUX 130 are to be selected, the LUT selection for logic control of the inputs, the state machine controls, and the trigger output rules to use. The user programs register set 140 to specify which security mechanisms are to be monitored and how to detect a security event. Each tamper block may have a separate register set 140 or there may be a single centralized register set usable by and for all three tamper blocks.

The MUX 130 receives multiple input signals. In some embodiments, there are 10 input signals some of which comprise signals from one or more GPIO pins. Other embodiments of MUX 130 have a different number of input signals. The input signals to MUX 130 may comprise over or under temperature, over or under voltage, and over or under current signals from the internal sensors 122. The MUX input signals may comprise the pulse generator signal 129 which is asserted by the pulse generator 126 upon detection of a mismatch between an input signal to the pulse generator and a corresponding output signal as explained above. Further, the MUX input signals may also specify whether the main power source 115 and the battery 128 are operational or not. An additional input to the MUX 130 can be a signal based on the RC oscillator 133. The RC oscillator may be implemented as a pair of oscillators whose phase is compared. A signal is generated based on the phase difference. If the phase difference is greater than a threshold (indicative of excessive temperature), the signal is a 1. If the phase difference is less than the threshold, the signal is a 0. A comparator is provided as part of the oscillator 133 for this purpose.

TB1 and TB2 include state machine 134 which can be programmed to detect a variety of conditions and perform a variety of resulting actions. The use of counters is included as well in TB1 and TB2 to permit these tamper blocks to factor time into their state transitions and trigger events. For example, the register set 140 can be programmed for TB1 so that a trigger event is generated if, over a programmed period of time, the temperature is outside a predetermined range or a voltage is outside its predetermined range.

TB0 is similar to TB1 and TB2 but does not include a state machine. Instead, TB0 is pure combinatorial logic. Counters are not used for TB0.

The LUT 132 can be configured via the register set 140 to logically combine together the various selected MUX inputs to produce a single output signal/bit. Which MUX inputs are selected for use by the LUT and how the LUT is to logically combine together the selected MUX inputs is programmed through the register set 140. In accordance with the preferred embodiments, the LUT 132 can be programmed to logically AND, OR, or exclusive-OR the selected MUX inputs.

Figure 3:
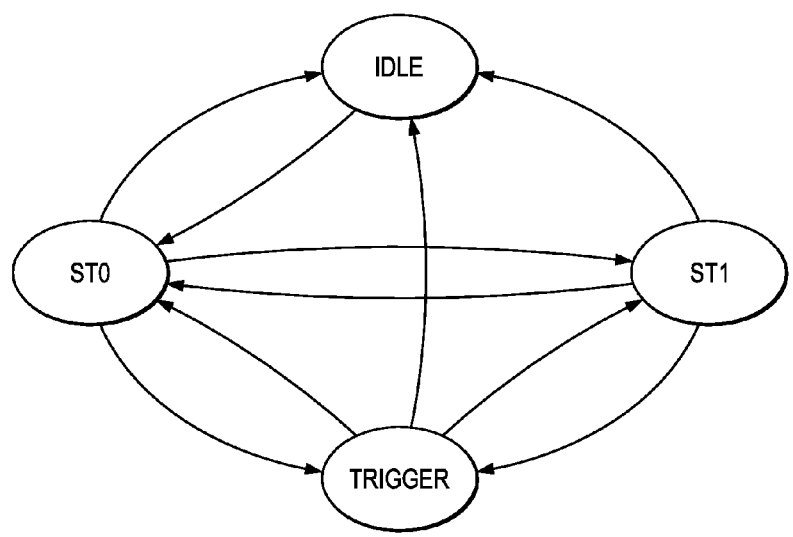
FIG. 3 illustrates a state diagram in accordance with the preferred embodiments.

The state machine 134 for each of TB1 and TB2 preferably comprises four states, although a different number of states can be implemented in other embodiments. FIG. 3 illustrates that the four states include an IDLE state, an ST0 state, a ST1 state, and a TRIGGER state. Transitions from states ST0, ST1, and TRIGGER can be to any of the other three states. Transition from the IDLE state preferably is only to state ST0. The state transitions are programmed through the register set 140.

Two states (IDLE and TRIGGER) are terminals, and two states (ST0 and ST1) are controllable. The ST0 and ST1 states may change the operation of the MUX 130 and LUT 132 to allow changing of the rules about which inputs to use and what LUT logic to use. Preferably, the changes are applied on the next clock cycle. The counters 135 indicate the number of clock cycles to wait until a potential action can occur. If the count is set to a value 0 in register set 140, the counter 135 will automatically be initialized to a random value.

Table I below summarizes the operation of the state machine for tamper blocks TB1 and TB2.

TABLE I

STATE MACHINE

| Name | MUX/LUT change | Counter | Test for Action | Action |
|---|---|---|---|---|
| IDLE | No | No | 1 from LUT | Moves to ST0 on test. |
| ST0 | Yes | 10-bit | Select any of: Counter not 0, LUT is 0 Counter not 0, LUT is 1 Counter 0, LUT is 0 Counter 0, LUT is 1 | Each test may send to any of the 4 states. Own index (self) has a different meaning depending on value of counter: If Counter is not 0, will continue counting. If Counter is 0, will re-enter state and reload counter. |
| ST1 | Yes | 10-bit | Select any of: Counter not 0, LUT is 0 Counter not 0, LUT is 1 Counter 0, LUT is 0 Counter 0, LUT is 1 | Same actions as ST0. May pulse output to the trigger on entry. |
| Trig | No | No | Select any of: LUT is 0 LUT is 1 Always | Pulses trigger on 1$^{st}$ entry to this state. Tests may send to another state, including IDLE. If own index (self), will stay on this state until reset by software and will not pulse trigger again. |

The state machine initializes upon power on to system 100 to the IDLE state. The state machine transitions from the IDLE state to the ST0 state upon detection of a 1 from LUT 132. Once in the ST0 state, the state machine can test for any of a variety of conditions. For example, the tests can be whether or not the counter has counted down to 0 and also whether the LUT output is a 1 or 0. Thus, four tests are possible as shown in Table I above. The resulting action to be taken if any of these tests produces a positive result is programmable through register set 140. The resulting action can be to transition to any of the four states including the TRIGGER state. If the action is to remain in the ST0 state, the counter will continue counting if not already at 0. However, if the action is to remain in the ST0 state and the counter already has counted down to 0, the action will be to re-load the counter with an initial value (programmed via one of the registers in the register set).

The operation of ST1 state is similar to the ST0 state. The ST1 state can be configured to pulse output to the trigger output unit 136 as an additional action to be taken if a condition is positive.

The operation of the TRIGGER state is as follows. While in the TRIGGER state, any of a variety of security responses can be programmed to occur. Examples include scrubbing memory, resetting the system, performing a direct memory access (DMA), triggering a non-maskable interrupt (NMI), etc. The TRIGGER state can transition to any of the other three states upon occurrence of a programmed condition, or remain in the TRIGGER state. The conditions to be tested include determining whether the LUT output is a 0 or 1.

Table II below lists the various registers included within each register set 140. The registers are read/write registers. The first five registers (TB0 Control, TB0 Selector, TB0 Sense Invert, TB0 LUT, and TB0 Trig Control) are dedicated for use in configuring trigger block TB0 and thus are included in register set 140 for TB0. The next 11 registers (TB1 Control, TB1 Selector, TB1 Sense Invert, TB1 LUT, TB1 ST0, TB1 ST1, TB1 ST0MASK, TB1, ST1MASK, TB1 Trig Control, TB1 ST0 Counter, and TB1 ST1 Counter) are dedicated for use in configuring trigger block TB1 and thus are included in register set 140 for TB1. The next 11 registers (TB2 Control, TB2 Selector, TB2 Sense Invert, TB2 LUT, TB2 ST0, TB2 ST1, TB2 ST0MASK, TB2 ST1MASK, TB2 Trig Control, TB2 ST0 Counter, and TB2 ST1 Counter) are dedicated for use in configuring trigger block TB2 and thus are included in register set 140 for TB2. The remaining six registers (PG Master, PG0 Counter, PG1 Counter, PG2 Counter, PG3 Counter, and PG Trig Control) are used to program the pulse generator unit 126. Each register preferably comprises 16 bits, although different numbers of bits are possible in other embodiments.

TABLE II

REGISTERS

| Name | Type | Reset | Description |
|---|---|---|---|
| TB0 Control | R/W | 0x0000 | Trigger block 0 control |
| TB0 Selector | R/W | 0x0000 | Trigger block 0 input selector mask |
| TB0 Sense Invert | R/W | 0x0000 | Trigger block 0 input sense invert |
| TB0 LUT | R/W | 0x0000 | Trigger block 0 LUT |
| TB0 Trig Control | R/W | 0x0000 | Trigger block 0 Trigger control (no state machine). |
| TB1 Control | R/W | 0x0000 | Trigger block 1 control |
| TB1 Selector | R/W | 0x0000 | Trigger block 1 input selector mask |
| TB1 Sense Invert | R/W | 0x0000 | Trigger block 1 input sense invert |
| TB1 LUT | R/W | 0x0000 | Trigger block 1 LUT |
| TB1 ST0 | R/W | 0x0000 | Trigger block 1 State 0 control |
| TB1 ST1 | R/W | 0x0000 | Trigger block 1 State 1 control |
| TB1 ST0MASK | R/W | 0x0000 | Trigger block 1 State 0 mask |
| TB1 ST1MASK | R/W | 0x0000 | Trigger block 1 State 1 mask |
| TB1 Trig control | R/W | 0x0000 | Trigger block 1 Trigger control |
| TB1 ST0 Counter | R/W | 0x0000 | Trigger block 1 State 0 counter |
| TB1 ST1 Counter | R/W | 0x0000 | Trigger block 1 State 1 counter |
| TB2 Control | R/W | 0x0000 | Trigger block 2 control |
| TB2 Selector | R/W | 0x0000 | Trigger block 2 input selector mask |
| TB2 Sense Invert | R/W | 0x0000 | Trigger block 2 input sense invert |
| TB2 LUT | R/W | 0x0000 | Trigger block 2 LUT |
| TB2 ST0 | R/W | 0x0000 | Trigger block 2 State 0 control |
| TB2 ST1 | R/W | 0x0000 | Trigger block 2 State 1 control |
| TB2 ST0MASK | R/W | 0x0000 | Trigger block 2 State 0 mask |
| TB2 ST1MASK | R/W | 0x0000 | Trigger block 2 State 1 mask |
| TB2 Trig control | R/W | 0x0000 | Trigger block 2 Trigger control |
| TB2 ST0 Counter | R/W | 0x0000 | Trigger block 2 State 0 counter |
| TB2 ST1 Counter | R/W | 0x0000 | Trigger block 2 State 1 counter |
| PG Master | R/W | 0x0000 | Pulse Generator Master register |
| PG0 Counter | R/W | 0x0000 | Pulse Generator Channel 0 counter |
| PG1 Counter | R/W | 0x0000 | Pulse Generator Channel 1 counter |
| PG2 Counter | R/W | 0x0000 | Pulse Generator Channel 2 counter |
| PG3 Counter | R/W | 0x0000 | Pulse Generator Channel 3 counter |
| PG Trig Control | R/W | 0x0000 | Pulse Generator Trigger control |

As can be seen from Table II above, each tamper block has some registers in common with the other tamper blocks. For example, each of the tamper blocks has a Control register (TB0 Control, TB1 Control, and TB2 Control), a Selector register, a Sense Invert register, a LUT register, and a Trig Control register. Because TB1 and TB2 operate in accordance with a state machine and use counters while TB0 does not have a state machine and does not use counters, TB1 and TB2 include state control registers (ST0 and ST1), state mask registers (ST0MASK and ST1MASK), and Counter registers (ST0 Counter and ST1 Counter). TB0 does not use mask and counter registers. The following register descriptions are in accordance with a preferred embodiment, but the bit assignments in the registers can be varied as desired. For example, the number of bits defining a particular field can be varied as desired.

Trigger Block Control Register

The Control register (common to all tamper blocks and also referred to as the trigger block control register) is used to enable the trigger block, control and ascertain the present state of the state machine, and control the source/sink GPIOs. Table III below illustrates one possible embodiment of the contents of the Control register.

TABLE III

TRIGGER BLOCK CONTROL REGISTER

| Bit/Field | Name | Type | Reset | Description |
|---|---|---|---|---|
| 15:12 | Reserved | RO | 0 | Should be left 0. |
| 11:9 | GPOUTSEL | RW | 0 | Selects which GPIO is to be used for trigger output for this trigger block or 0 if no output associated. |
| 8:6, 5:3 | GPI1SEL, GP0SEL | RW | 0 | Selects which GPIO is to be used for GP0 and GP1 for this trigger block or 0 if no input is to be associated. This can select from up to 7 possible GPIOs. |
| 2:1 | STATE | RW | 0 | Indicates current state in the state machine of this trigger block. |
| 0 | ENA | RW | 0 | Is used to enable the trigger block. |

The Control register preferably comprises five active fields and one reserved field (e.g., bits 15:12). The five active fields are the GPOUTSEL field (bits 11:9), the GPI1SEL field (bits 8:6), GP0SEL field (bits 5:3), the STATE field (bits 2:1), and the ENA field (bit 0).

The GPOUTSEL field selects which GPIO is to be used for the trigger output from trigger output unit 136 for this trigger block. If no output from the trigger block is to be selected, then this field is all 0's. The GPI1SEL and GP0SEL fields select which GPIO is used for GP0 and GP1 for the corresponding trigger block, or 0 if no input is to be associated. With three bits for each of the GPISEL and GPOSEL fields, up to seven GPIOs are available for selection.

The STATE field indicates the current state of the state machine for the corresponding trigger block. As described above for at least one embodiment, the state machine comprises four states (IDLE, ST0, ST1, and TRIGGER) and thus the STATE field includes two bits to specify which state is the current state.

The ENA bit is an enable bit that is used to enable and disable the trigger block (e.g., 0 is disable and 1 is enable, or vice versa).

Selector Register

The Selector register (common to all tamper blocks) is used to select which inputs to MUX 130 to use for detection of a security violation. The inputs selected may originate from the GPIOs (sourced), analog comparators (in the case of voltage and current sensing), thermal sensor(s), oscillator flat-line detect, and brown-out detect. Selected GPIO pins can be connected to any type of hardware desired to detect a possible security breach. One example includes a break-away strap on or part of the enclosure 101 that asserts a signal if the strap is tampered with. Thermal sensors can be used to indicate an excessively high or low temperature. Failure of the oscillator 133 can be ascertained by providing the oscillator's output to an input of the MUX 130. There are two power domains in system 100 as noted above. One power is associated with the host logic 102 and generally originates from the external power source 115. The other power domain is for the intrusion security logic which can operate from the external power source 115, if present, or from battery 128. A reduction in either voltage (brown out condition) can be detected by voltage comparators (not shown) whose outputs are provided to the MUX 130 as inputs.

The Selector register includes a plurality of bits, each associated with a corresponding MUX input. Preferably, a single bit (although more than one bit is possible in other embodiments) in the Selector register is used to specify whether a corresponding MUX input is to be selected. Table IV below illustrates one embodiment of the contents of the Selector register.

TABLE IV

Selector register

| Bit/Field | Name | Type | Reset | Description |
|---|---|---|---|---|
| 15:10 | Reserved | RO | 0 | Should be left 0. |
| 9 | HBO | RW | 0 | HIB Brown-out detect. If masked, will act as input 1 if brown-out from HIB (battery failing). If this and ABO selected, they will be OR'ed together. |
| 8 | ABO | RW | 0 | Active Brown-out detect. If masked, will act as input 1 if brown-out from active mode (main rail is failing). If this and HBO selected, they will be OR'ed together. |
| 7 | ROS | RW | 0 | RTC Oscillator flat-line detect. If masked, will act as input 1 if RTC oscillator input is not detected (32 KHz crystal or oscillator). If this and MOS are selected, they will be OR'ed together. |
| 6 | MOS | RW | 0 | Main Oscillator flat-line detect. If masked, will act as input 1 if Main oscillator input is not detected (Crystal or single end osc input). If this and ROS are selected, they will be OR'ed. |
| 5 | THR | RW | 0 | Thermal event. If masked, will act as input 1 if thermal over or under temp detection. This will be from dual-oscillators detecting over or under temp such that it would cause change in behavior (outside minimal industrial spec). |
| 4, 3 | AC1, AC0 | RW | 0 | Analog comparator match. If masked, will input as 1 if match, 0 if not match. The actual analog comparators used will depend on which trigger block. |
| 2, 1, 0 | GP2, GP1, GP0 | RW | 0 | GPIO level input. If masked, will input level as 1 if high, 0 if low. The actual GPIOs used will depend on source select. |

Multiple oscillators can be provided as part of the intrusion security logic—a real time clock (RTC) oscillator and a main oscillator.

Some of the inputs may be combined if both selected as they only apply based on mode (e.g. HIB and Active brown-out). Any bit that is 1 is masked (i.e., selected), else it is de-selected. The inverter mask of the Sense Invert register described below allows changing the bit sense of any masked (selected) inputs. The bits in the Selector register forms the base selector. The state machine 134 (in the case of TB1 and TB2), however, may change these bits temporarily (the logic will use the state machine's version), as will be explained below.

Sense Invert Register

The Sense Invert register (common to all tamper blocks) comprises bits that each correspond to a particular MUX input signal. The state of each such register bit specifies whether the value of a corresponding MUX input signal is inverted (1 to 0, or 0 to 1) to facilitate use in triggering. Any register bit that is a 1, if also masked (selected), will be inverted; else it is unaffected. Table V below shows one embodiment of the contents of the Sense Invert register.

TABLE V

Sense Invert register

| Bit/Field | Name | Type | Reset | Description |
|---|---|---|---|---|
| 15:10 | Reserved | RO | 0 | Should be left 0. |
| 9, 8 | HBO, ABO | RW | 0 | If set, Brown-out detect is inverted. If HBO and ABO both selected, they will be OR'ed after inverting. |
| 7, 6 | ROS, MOS | RW | 0 | If set, Oscillator flat-line detect is inverted. If ROS and MOS are both selected, they will be OR'ed after inverting. |
| 5 | THR | RW | 0 | If set, Thermal event is inverted. |
| 4, 3 | AC1, AC0 | RW | 0 | If set, Analog comparator match input is inverted. |
| 2, 1, 0 | GP2, GP1, GP0 | RW | 0 | If set, GPIO level input is inverted. |

The LUT 132 provides the logic to combine all selected inputs (selected using the Selector register, and inverted if desired using the Sense Invert register). The output of the LUT 132 is used for the state machine 134 and/or trigger output unit 136. Note that this forms the base LUT; the state machine 134 may change these bits temporarily (the logic will use the state machine's version). In accordance with at least some embodiments, the selected MUX input signals can be OR'd, ANDed, or XOR'd together based on the value of at least two bits in the LUT register described below.

LUT Register

The LUT provides the logic to combine all selected inputs (selected using the select register, possibly inverted using the invert register). The output of the LUT is used for the state machine and/or trigger. This forms the base LUT; the state machine may change these bits temporarily (the logic will use the state machine's version). Table VI below shows one embodiment of the contents of the LUT register.

TABLE VI

LUT register

| Bit/Field | Name | Type | Reset | Description |
|---|---|---|---|---|
| 15:2 | Reserved | RO | 0 | Should be left 0. |
| 1:0 | LUT | RW | 0 | Selects the logic to combine the inputs: 0: ORs all inputs 1: ANDs all inputs 2: XORs all inputs 3: reserved |

Trigger Control Register

The Trigger (Trig) Control register (common to all tamper blocks) controls the trigger state as well as the triggers themselves. For Trigger block 0 (no state machine), the Trigger Test (TTEST), Trigger Action (TACT), and the ST1TR fields are not used, but the remaining trigger action fields are used. Table VII below shows one embodiment of the contents of the Trig Control register.

TABLE VII

Trig Control Register

| Bit/Field | Name | Type | Reset | Description |
|---|---|---|---|---|
| 15:14 | TTEST | RW | 0 | Test for Trigger state action if not TB0. Values are:<br>b00 Do not trigger<br>b01 LUT output of 0.<br>b10 LUT output of 1.<br>b11 Always. |
| 13:12 | TACT | RW | 0 | Trigger state's next state action if not TB0. This selects which state to go to next. If itself (3), it will stay on this state until reset by software. |
| 11:10 | ST1TR | RW | 0 | Trigger on entry to ST1 if not TB0. Values are:<br>0 No trigger<br>1 Trigger on entry from another state.<br>2 Trigger on each entry (including re-enter).<br>3 Reserved |
| 7:6 | ACT | RW | 0 | Trigger action to take if in active state now. Values are:<br>0 No action<br>1 SReset system after 1 cycle.<br>2 DMA trigger the associated DMA channel.<br>3 NMI |
| 5:4 | HIBACT | RW | 0 | Trigger action to take if in HIB state now. Values are:<br>0 No action<br>1 SReset system after 1 cycle.<br>2 Wake from HIB with NMI<br>3 Reserved |
| 3:2 | HIBMEM | RW | 0 | Trigger action on HIB memory. Values are:<br>0 No affect on HIB Memory<br>1 Scrub HIB memory if active state.<br>2 Scrub retention memory if in HIB.<br>3 Scrub retention memory always. |
| 1:0 | PIN | RW | 0 | Trigger Pin assertion. This chooses an action on the output pin as assigned by the GPIO sink field. Values are:<br>0 No affect on pin<br>1 Output LOW on pin<br>2 Output HIGH on pin<br>3 Invert state of pin |

The TTEST field specifies what condition is to be tested once the state machine for TB1 and TB2 are in the TRIGGER state. The "always" test can be specified which causes the state machine to remain in the TRIGGER state indefinitely until reset by software. Two LUT tests can be implemented. One LUT tests determines if the LUT output is a 0 and the other LUT test determines if the LUT output is a 1. The "do not trigger test" means that the trigger will not occur.

The TACT field specifies the next state for the state machine (for TB1 and TB2) to enter once the specified test in the TTEST field proves positive. The next state can be any of the other three states as well as the TRIGGER state itself. If the TRIGGER state is selected, then the state machine remains in the TRIGGER state until the TACT field is reset by software.

The ST1TR field controls the triggering, or lack thereof, regarding entry to the ST1 state.

The ACT, HIBACT, HIBMEM, and PIN fields specify how the trigger output unit 136 is to respond. The ACT field specifies the trigger action if the intrusion security logic is an active power state (e.g., running from the main external power source 115). Actions include resetting the entire system, performing a DMA, or generating an NMI to host logic processor 106. The HIBACT field specifies the trigger action if the intrusion security logic is the HIB power state (e.g., running from battery 128). Actions include resetting the entire system (preferably after one clock cycle), or waking from the HIB power state with an NMI.

Memory can also be scrubbed as specified by the HIB-MEM field. The battery-backed memory 124 and/or the secure storage 134 can be scrubbed depending on whether the intrusion security logic 104 is the active state or the HIB power state. Scrubbing memory preferably includes permanently erasing the memory so that the original contents cannot be recovered. For example, scrubbing memory may involved mass writing 1's to all memory locations to force electrons into the oxide. Preferably, scrubbing does not simply involve only erasing (0ing) the contents.

The PIN field specifies the state of the output pin as assigned by the GPOUTSEL sink field in the Trigger Block Control register.

ST0 and ST1 Control Registers

ST0 and ST1 registers (not used for TB0) are control registers that specify if a counter is to be used, specify the action to test for, and what action to take if a test is met. Table VIII below shows one embodiment of the contents of the ST0 and ST1 registers.

TABLE VIII

ST0 and ST1 Control Registers

| Bit/Field | Name | Type | Reset | Description |
|---|---|---|---|---|
| 15:6 | COUNTER | RW | 0 | Counter reload value for state machine on entry to this state. Is 1 if counter is not used. If 0, counter will be loaded with a random value each time (using RNG). |
| 5:2 | TEST | RW | 0 | Test for action. May select any combination of bits, where each bit in field is defined as selecting when to take action:<br>b1000 Counter != 0 and LUT output is 1.<br>b0100 Counter != 0 and LUT output is 0.<br>b0010 Counter = 0 and LUT output is 1.<br>b0001 Counter = 0 and LUT output is 0. |
| 1:0 | ACTION | RW | 0 | Action to take in terms of next state to go to. If state index of select (ST0 is 1, ST1 is 2), then has special meaning depending on value of counter:<br>(1) Counter is 0: will re-enter state and reload counter.<br>(2) Counter is not 0: will continue counting. |

The COUNTER field comprises the value to be loaded into the counter upon entry into the corresponding state. A value of 1 for this field means no counter is used for the corresponding state. Otherwise, the value is the counter initial load value. For example, the ST1 Control Register contains a value that, upon entry into the ST1 state, is loaded into the counter associated with the ST1 state. Similarly, the ST0 Control Register contains a value that, upon entry into the ST0 state, is loaded into the counter associated with the ST0 state.

The TEST field specifies the test(s) to be performed using the counter and the LUT output. As explained previously, the tests can be whether or not the counter has counted down to 0 and also whether the LUT output is a 1 or 0. Thus, four tests are possible—(1) counter not yet 0 and LUT output is 1, (2) counter not yet 0 and LUT output is a 0, (3) counter is at 0 and LUT output is a 1, and (4) counter is at 0 and LUT output is a 0.

The resulting action to be taken if any of these tests produces a positive result is specified in the ACTION field. The resulting action can be to transition to any of the other states including the TRIGGER state, or to remain in the current state. If the action is to remain in the current state (for ST0 or ST1), the counter will continue counting if not already at 0. However, if the action is to remain in the current ST0 or ST1 state and the counter already has counted down to 0, the action will be to re-load the counter with the value provided in the COUNTER field.

ST0MASK and ST1MASK Registers

The TB1 ST0MASK and TB1 ST1MASK registers allow a state to change the mask and LUT upon entry. Table IX below shows one embodiment of the contents of the ST0Mask and ST1 Mask registers.

TABLE IX

ST0MASK and ST1MASK Registers

| Bit/Field | Name | Type | Reset | Description |
|---|---|---|---|---|
| 15:14 | Reserved | RO | 0 | Should be 0. |
| 13:4 | INPMASK | RW | 0 | Replacement input mask to use instead of selector register if USE is 1. Sense invert will still apply. |
| 3 | Reserved | RO | 0 | Should be 0. |
| 2:1 | LUT | RW | 0 | Replacement LUT to use instead of LUT register if USE is 1. |
| 0 | USE | RW | 0 | If 1, LUT and INPMASK will replace the default values when in this state. |

The USE field specifies whether replacement LUT logical operation specification (AND, OR, XOR) and replacement mask bits from the Selector Mask register are to be used. If USE is a 1, then the replacement LUT and mask can be found in the LUT field and the INPMASK fields. If USE is a 0, then the LUT and INPMASK fields in the ST0MASK/ST1MASK register is ignored.

ST0 Counter and ST1 Counter Registers

The ST0 Counter and ST1 Counter registers (not used for TB0) contain the current count for the state counter. In some embodiments, the count value is a 10 bit value, although it can be other than 10 bits in other embodiments.

Pulse Generator Registers

Table II above also shows that the register set 140 includes a pulse generator (PG) Master register. The PG Master register controls all pulse generator channels. The register dedicates two bits to the control of each of four pulse generators, although the number of control bits as well as the number of pulse generators can be varied as desired. Each pair of control bits can be used to specify any of the three states—Disabled, Trigger on first mismatch, or Trigger on second mismatch (mismatch refers to a mismatch between pulse generator output and corresponding input as explained above).

Four PG Counter registers are provided, one for each of the pulse generator channels. Each of the PG Counter registers preferably includes a 10-bit field to specify the counter reload value once the counter counts down to its terminal value (e.g., 0). If the counter reload field is loaded with a value of 0, a random counter value (generated using a random number generator) will be loaded instead.

Finally, a PG Trig Control register is as described above in Table VII.

The registers described herein permit a user to configure the intrusion security logic to assert a trigger signal to perform a desired security action (e.g., scrub memory) upon detection of a certain condition (e.g., improper voltage, current, temperature, oscillator state, etc.) for a desired amount of time. The amount of time is measured by the counters. By incorporating time into the security breach detection, false positives can be reduced or avoided. A false positive security breach might occur if the system 100 were dropped or other inadvertently mishandled thereby causing the break-away straps to momentarily assert a false positive signal. By using time in the decision process, the security system can avoid actively responded to such momentary assertions from the security mechanisms.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   an enclosure;
   host logic contained in said enclosure;
   intrusion security logic also contained in said enclosure, said intrusion security logic coupled to said host logic and configured to detect an intrusion security to said system and to respond to said security intrusion with a user-configurable trigger event,
   the user-configured trigger event including at least:
      a) which types of input stimuli correlated to a physical condition of a security intrusion of the enclosure are to be monitored for detection of a security breach, and
      b) what sort of response the intrusion security logic should perform upon detection of the security breach,
   wherein said intrusion security logic implements at least two tamper blocks, each tamper block configured to: monitor one more input signals and initiate a trigger event when a security breach of the enclosure is detected correlated to said physical condition, and
   wherein at least one of said tamper blocks comprises a state machine whose operation is controlled by way of user-programmable registers.

2. The system of claim 1 wherein at least one tamper block does not implement a state machine.

3. The system of claim 1 wherein each of a plurality of the tamper blocks comprises a state machine whose operation is controlled by way of user-programmable registers.

4. The system of claim 1 wherein said user-programmable registers comprises a selector register that is configurable to specify which input signals to select for initiation of a trigger event.

5. The system of claim 4 wherein said user-programmable registers comprises a look-up table (LUT) register that is configurable to specify the logical operation used to combine the inputs selected by the selector register.

6. The system of claim 5 wherein the logical operation is an operation selected from a group consisting of OR, AND, and XOR.

7. The system of claim 1 further comprising a plurality of general purpose input/output (GPIO) pins, and wherein said user-programmable registers comprises a trigger block control register that is configurable to specify which GPIO pin to use for a trigger event.

8. The system of claim 7 wherein said trigger block control register also specifies the state of the state machine of the corresponding tamper block.

9. The system of claim 1 wherein said user-programmable registers comprises a sense invert register that is configurable to separately specify whether or not each input signal is to be inverted.

10. The system of claim 1 wherein said user-programmable registers comprises a trigger control register that is configurable to specify whether a trigger event is to be initiated based on whether a logical combination of the input signals is of a particular, programmable logic level.

11. The system of claim 1 wherein said user-programmable registers comprises a state control register that is configurable to specify whether a counter is to be used for a particular state of the state machine.

12. The system of claim 1 wherein said user-programmable registers comprises a state control register that is configurable to specify a condition for which to be tested to specify when a next state is to be entered.

13. A system, comprising:
a multiplexer having a plurality of input signals; and
logic coupled to said multiplexer and configured to implement a state machine, said logic configured to detect a security intrusion to an enclosure of said system and to respond to said security intrusion with a user-configurable trigger event;
the user-configured trigger event including at least:
a) which types of input stimuli are to be monitored for detection of a security breach correlated to a physical condition correlated to a physical condition of a security intrusion of the enclosure, and
b) what sort of response the intrusion security logic should perform upon detection of the security breach, and
a plurality of user-configurable registers that controls the operation of the state machine and the multiplexer.

14. The system of claim 13 wherein said user-programmable registers comprises a selector register that is configurable to specify which input signals to the multiplexer to select for initiation of a trigger event.

15. The system of claim 14 wherein said user-programmable registers comprises a look-up table (LUT) register that is configurable to specify the logical operation used to combine the inputs selected by the selector register.

16. The system of claim 15 wherein the logical operation is an operation selected from a group consisting of OR, AND, and XOR.

17. The system of claim 13 further comprising a plurality of general purpose input/output (GPIO) pins, and wherein said user-programmable registers comprises a trigger block control register that is configurable to specify which GPIO pin to use for a trigger event.

18. The system of claim 17 wherein said trigger block control register also specifies the state of the state machine.

19. The system of claim 13 wherein said user-programmable registers comprises a sense invert register that is configurable to separately specify whether or not each input signal to the multiplexer is to be inverted.

20. The system of claim 13 wherein said user-programmable registers comprises a trigger control register that is configurable to specify whether a trigger event is to be initiated by the state machine based on whether a logical combination of the input signals to the multiplexer is of a particular, programmable logic level.

21. The system of claim 13 wherein said user-programmable registers comprises a state control register that is configurable to specify whether a counter is to be used for a particular state of the state machine.

22. The system of claim 13 wherein said user-programmable registers comprises a state control register that is configurable to specify a condition for which to be tested to specify when a next state is to be entered.

* * * * *